United States Patent [19]

Gulliksen

[11] 4,303,746

[45] Dec. 1, 1981

[54] STORAGE BATTERY CONSTRUCTION INCLUDING BONDED PLATE ASSEMBLY AND METHODS OF MAKING SAME

[75] Inventor: John E. Gulliksen, Shrewsbury, Mass.

[73] Assignee: Koehler Manufacturing Company, Marlborough, Mass.

[21] Appl. No.: 140,256

[22] Filed: Apr. 14, 1980

[51] Int. Cl.³ ............................................. H01M 4/75
[52] U.S. Cl. .................................... 429/140; 429/238
[58] Field of Search ............... 429/140, 141, 238, 233, 429/139, 136

[56] References Cited

U.S. PATENT DOCUMENTS

| | | | |
|---|---|---|---|
| 2,420,456 | 5/1947 | White | 429/140 |
| 3,014,975 | 12/1961 | Gumprecht et al. | 429/140 |
| 3,081,368 | 3/1963 | Wunsche | 429/233 |
| 3,503,807 | 3/1970 | Sundberg | 429/141 |
| 3,694,265 | 9/1972 | Sundberg | 429/136 |
| 4,011,370 | 3/1977 | Echerbom | 429/140 |
| 4,025,701 | 5/1977 | Sundberg | 429/140 |

*Primary Examiner*—Anthony Skapars

*Attorney, Agent, or Firm*—Hamilton, Brook, Smith & Reynolds

[57] ABSTRACT

A storage battery is constructed with a casing in which is contained an electrolyte and positive and negative plate means. The positive plate means includes a grid structure having a top bar and depending spines, active material, and braided or woven tubular bodies for locating the active material around the spines. A molded thermoplastic bonding element and a thermoplastic bonding material are combined in the positive plate in fused relationship to one another. The bonding element and the bonding material may, in one embodiment of the invention, be of the same chemical composition, and in another embodiment may be of differing chemical composition but fusible with one another within ranges of fusing or melting point temperatures which are common or close to one another. The thermoplastic bonding material may occur as constituent strands of the braided or woven tubular bodies and the molded thermoplastic bonding element is supported within the battery casing and occurs in fused relationship with respect to portions of said thermoplastic strands at points inside the tubular bodies. Portions of the tubular bodies are thus secured so as to resist formation of tube gaps due to swelling of active material in the tubular bodies.

2 Claims, 11 Drawing Figures

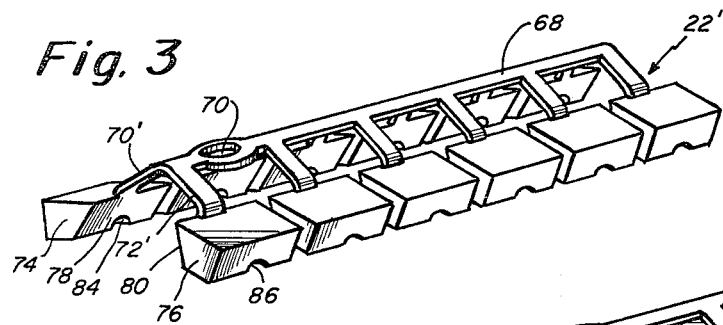
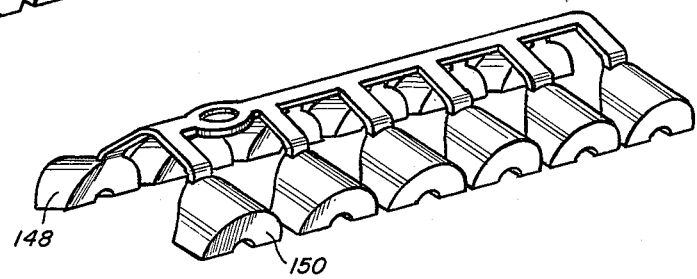
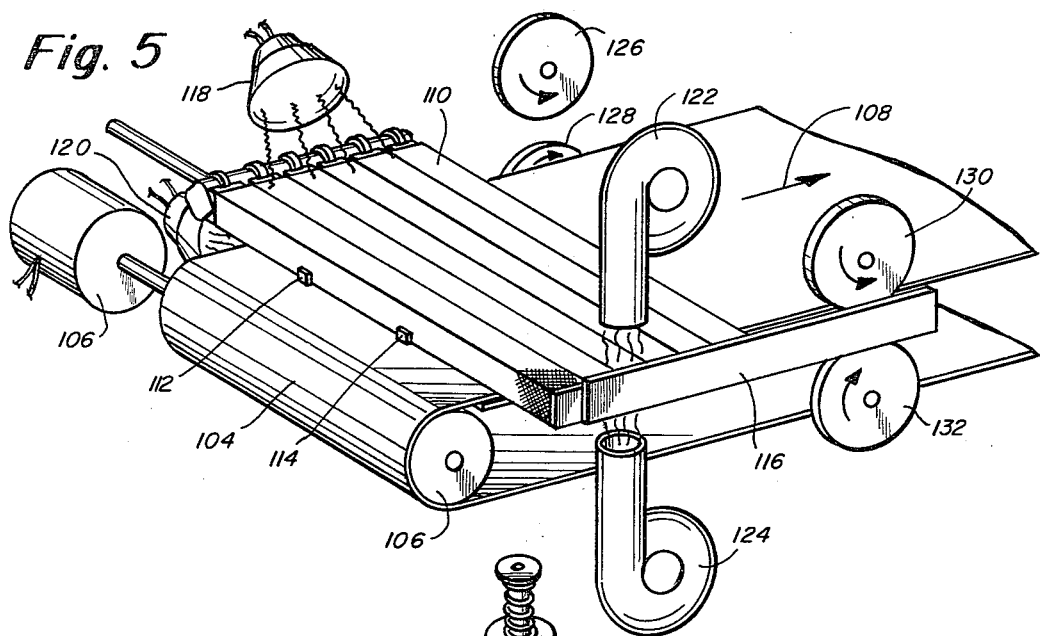
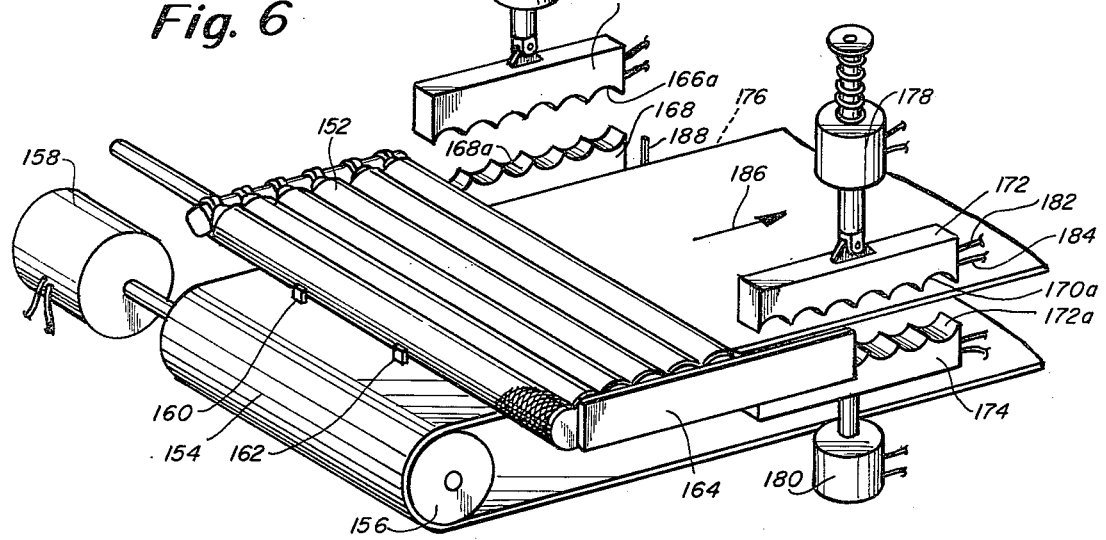

STORAGE BATTERY CONSTRUCTION INCLUDING BONDED PLATE ASSEMBLY AND METHODS OF MAKING SAME

BACKGROUND OF THE INVENTION

In the art of making positive plates of the tubular type for use in lead-acid batteries it is customary to provide a grid structure which includes a top bar having a plurality of current collecting spines depending therefrom and a post or burning lug means. Also included in this tubular type plate is active material, a plurality of tubes which are arranged to confine the active material around the spines and a bottom bar for closing the bottoms of the tubes.

The common practice is to provide for the tops and bottoms of tubes having a so-called interference fit with the spines and top bar and the spines and bottom bar surfaces. In the case of the tube tops, the spines at their point of junction with the top bar are formed with enlarged portions over which the tube tops are engaged to provide an interference fit. Similarly, the bottom bar is formed with insert portions having openings into which the bottoms of the spines are pressed to form a lower interference fitted relationship of parts. Enlarged insert portions of the bottom bar may be engaged within the tube bottoms to provide a further interference fit.

Plates of the construction described may, in some cases, fail to adequately constrain the active material during operation of the battery. Swelling of the active material (which constantly takes place) may exert forces against inner wall portions of the tops and bottoms of the tubes. These forces may be greater than the holding forces of the interference fits at the tube ends with the result that gaps may be formed at tops and bottoms of the tubes allowing active material to escape.

SUMMARY OF THE INVENTION

The present invention relates to a positive plate construction as employed in lead-acid batteries of the class having a casing with electrolyte contained therein, and the invention is particularly concerned with a positive plate construction having braided or woven tubular bodies to contain and confine active material, where the integrity of the plate is not dependent upon an interference fit of such tubes with spines of a grid or with portions of the bottom bar or upon an interference fit of the spines with the bottom bar, and which plate construction if of a design such that escape of swollen active material is effectively controlled.

It is an object of the invention therefore to devise a positive plate construction in which braided or woven tubular bodies are secured to a grid structure in such a manner as to effectively resist expansion forces of swollen active material.

A positive plate of this character has been devised based on the novel concept of combining, in a positive plate assembly, upper and lower bonding element means and a bonding material both of which may be of the same chemical composition or of different chemical compositions but fusible with one another within ranges of fusion which are common or close to one another. In one desirable embodiment braided tubular bodies have included in the braid constituent strands of a thermoplastic bonding material. Upper and lower molded bonding element means of the type indicated above occur in fused relationship with respect to portions of said strands at points inside each of the tubular bodies.

An important feature of the plate which is produced by this fusion technique is its increased resistance to expansion forces which may be exerted by active material contained within tube portions as the active material undergoes swelling action commonly known to occur. The new unitized plate construction provides a multiplicity of points of joinder of thermoplastic constituent strands of the tubes with upper and lower thermoplastic bonding element means to secure the ends of all the tubes of the plate in interlocking relationship with respect to the grid. Other important features of the invention include an improved method and means by which plate components may be rapidly and efficiently assembled and fused so as to contain active material. There is also disclosed desirable methods and apparatus for controlling fusion of thermoplastic surfaces of the thermoplastic strands and bonding elements.

BRIEF DESCRIPTION OF THE DRAWINGS

FIG. 3 is a detail perspective view of an molded bonding element of the invention designed for use in tubes of a square or rectangular cross-section.

FIG. 4 is another perspective view of an upper bonding element designed for use in tubes of cylindrical shape.

FIG. 5 is a diagrammatic view illustrating a method and apparatus for supporting a plurality of tubes and applying heat to carry out a desired fusion of thermoplastic material therein.

FIG. 6 is a view similar to FIG. 5 illustrating a modified form of apparatus.

DETAILED DESCRIPTION OF THE INVENTION

Figure 1:
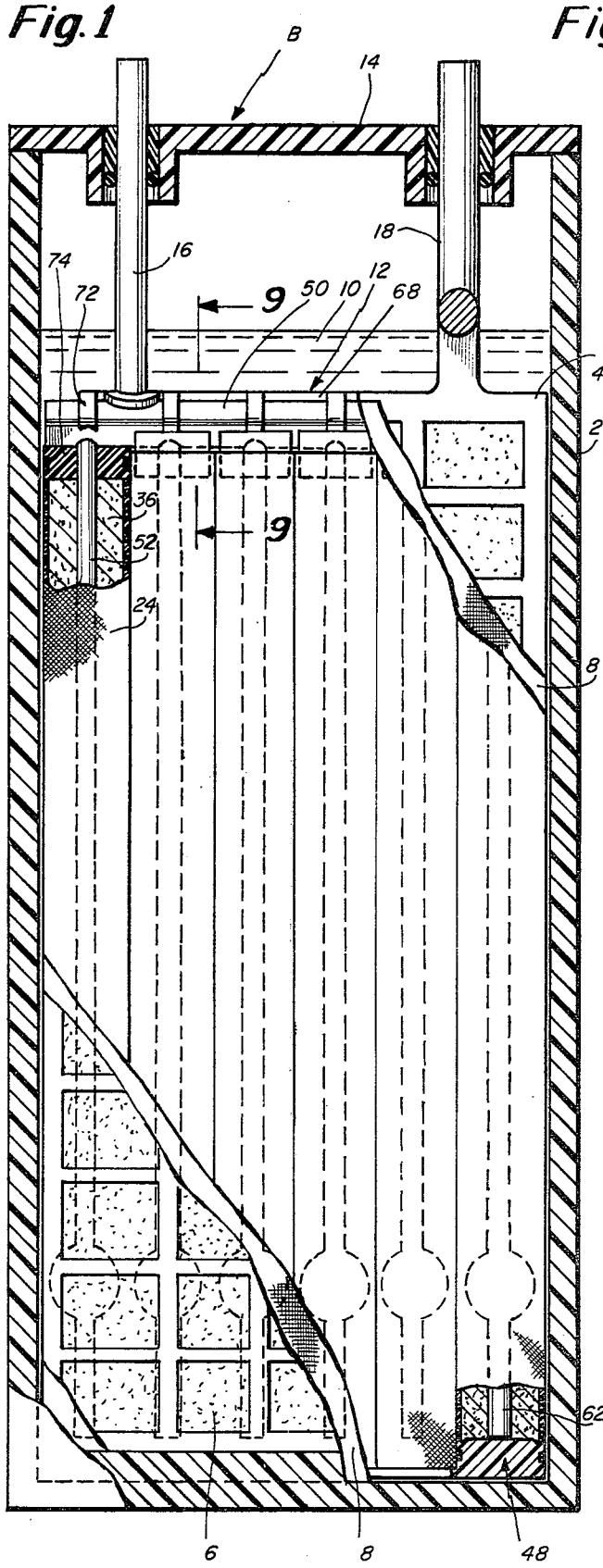
FIG. 1 is a vertical cross-section of a lead-acid storage battery having the bonded positive plate assembly of the invention mounted therein.

Referring in detail to the drawing, FIG. 1 illustrates a lead-acid battery, generally denoted by the arrow 3, comprising a casing 2 in which are received negative plates as 4 and 6, separators as 8, an electrolyte body 10, and positive plate means of the invention generally indicated by arrow 12. The casing 2 is sealably closed by cover member 14, through which extend and are sealably secured positive and negative posts 16 and 18 respectively. The said posts 16 and 18 may, in some cases, comprise burning lugs.

Figure 2:
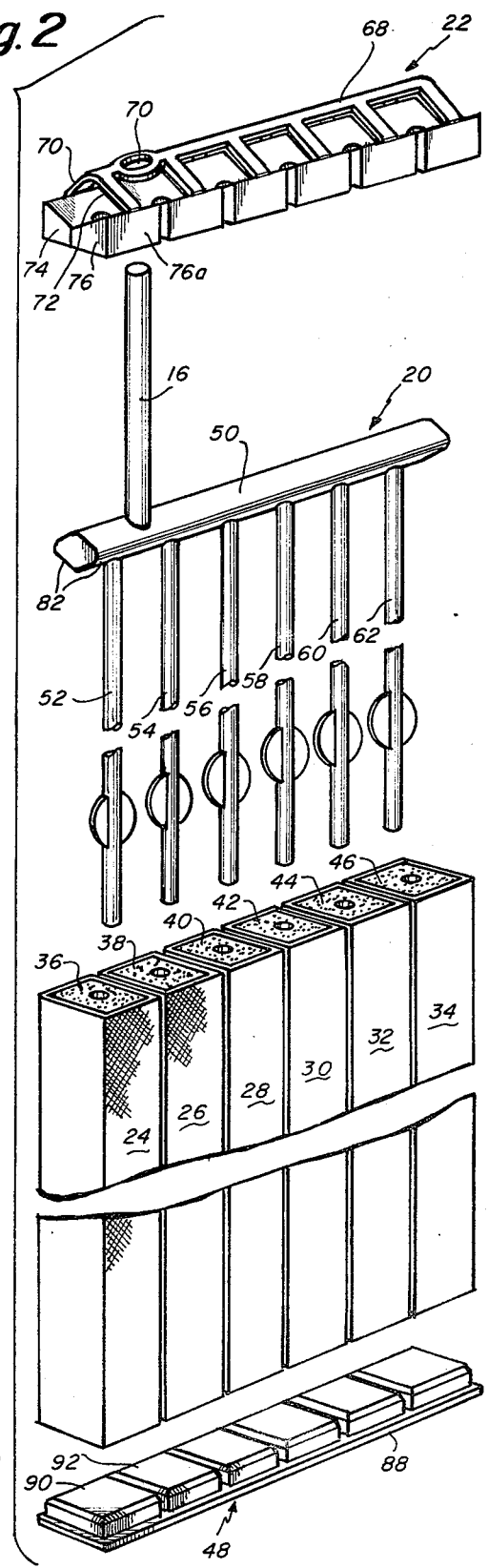
FIG. 2 is an exploded view illustrating components of the plate assembly of the invention in separated relationship.

The positive plate means arrow 12 is of the tubular type, and is illustrated with component parts separated in exploded relationship in FIG. 2. Said parts include a grid structure arrow 20, upper bonding element means arrow 22, tubular bodies as 24, 26, 28, 30, 32, 34, active material bodies as 36, 38, 40, 42, 44, 46, and lower bonding element means arrow 48. Grid structure arrow 20 is customarily cast from a lead alloy in a manner well known to the art, and includes a top bar 50, post or burning lug 16 extending at right angles thereto, and spaced apart current-collecting spines as 52, 54, 56, 58, 60, 62 depending downwardly from one side thereof. Spines as 52, 54, etc., are surrounded by confined active material bodies as 36, 38, etc. which bodies are of the usual composition.

Figure 8:
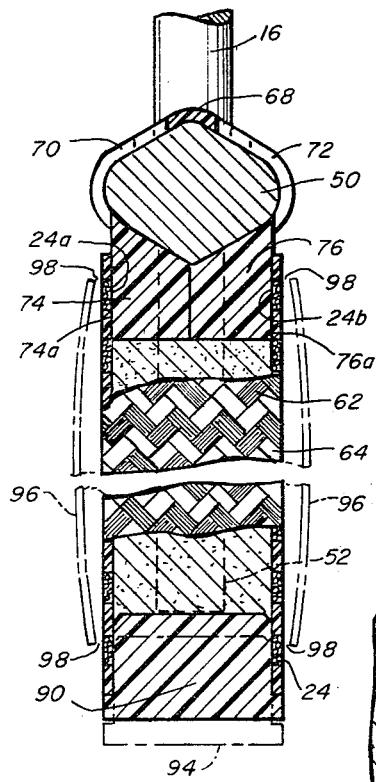
FIG. 8 is a detailed cross-sectional view of a top portion of a grid structure similar to that shown in FIG. 1, but indicating diagrammatically strands of a thermoplastic material in contact with upper and lower molded thermobonding elements as they occur prior to fusing.

Active material bodies as 36, 38, etc. are contained in and confined by means of tubular bodies as 24, 26, etc. In a preferred embodiment each of these tubular bodies comprises a fabricated tube, the walls of which consist of staple fibers such as glass fibers braided together with constituent strands or strips of a thermoplastic material which is chemically inert in the electrolyte; for example, a polyolefin such as polyethylene or polypropylene. The said thermoplastic constituents may include reinforcing material such as glass or polyester, and may be in the form of laminated strips. The surfaces of such constituents must, however, be of a thermoplastic material as described above. Such a braided arrangement is illustrated in FIG. 8, wherein the numeral 62 denotes staple fibers and the numeral 64 denotes thermoplastic constituents.

An upper bonding element means in its initial form, i.e. as it is fabricated, is illustrated in FIG. 3 generally denoted by arrow 22'. Upper bonding element means 22' may be molded from a thermoplastic compound, which compound must be chemically inert in a battery electrolyte and which must be capable of fusion over a common or overlapping range of temperatures with the material of the thermoplastic constituents as 64 of the tubular bodies. Again, a polyolefin such as polyethylene or polypropylene is satisfactory.

Upper bonding element means arrow 22' comprises an elongated body having top bar engaging parts including a top part 68 relieved to form an opening 70 through which a post or burning lug similar to numeral 16 of FIG. 2 may be extended, and spaced apart flexible sections as 70', 72' which support respective insert parts as 74, 76. Insert parts as 74, 76 are formed with sides as 78, 80 respectively, which are designed to fit around and enclose lower surfaces 82 of top bar 50 between spines as 52, 54, etc. Further, the said insert parts are separated one from the other to allow their insertion into individual tubes, and are formed with relieved portions as 84, 86 designed to fit around and enclose upper portions of spines as 52, 54 (FIG. 2).

Lower bonding element means arrow 48, illustrated in FIG. 2, may also be molded from a thermoplastic compound, which compound must have properties similar to those previously described. Lower bonding element means arrow 48 is formed, in one desired configuration, with a bottom part 88 on which are arranged in upwardly projecting relationship spaced apart insert parts 90, 92.

As a first step in the assembly of the positive plate means of the invention, upper bonding element means in the open form shown as arrow 22' in FIG. 3 is assembled to the grid structure arrow 20 by first engaging post 16 with opening 70, advancing grid structure arrow 20 until post 16 extends through opening 70 and top portion 68 of upper bonding element means abuts top bar 50. Flexible sections as 70', 72' of FIG. 3 are deformed and wrapped around top bar 50 so that they take the position shown by numerals 70, 72 of FIG. 2, and insert parts 74 and 76 are in a position for insertion into the tubular bodies, which position is also shown in FIG. 2. This wrapped relationship may be more clearly shown in FIGS. 1 and 8. Tubes as 24, 26, etc. are then threaded over spines as 52, 54 and advanced such that insert portions as 74, 76 enter the tops of respective tubes and surfaces as 74a, 76a of the said insert portions are in contact with surfaces as 24a, 24b of said tubes as is suggested in FIG. 8.

With this partial assembly of components the tops of tubes 24, 26, etc. are closed, and the assembly may then be placed in an inverted position. Active material may then be introduced into tubes as 24, 26, etc. to surround spines as 52, 54, etc. After introduction of the active material has been completed, lower bonding element arrow 48 may be attached, with insert parts as 90, 92 being inserted into the bottom ends of the tubes as 24, 26, etc. as appears in FIGS. 1 and 8.

Figure 10:
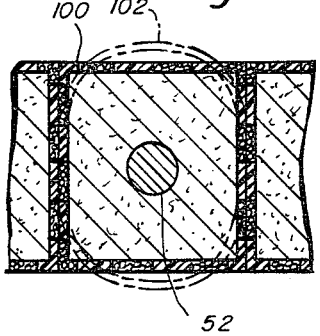
FIG. 10 is a detailed plan view indicating in cross-section a woven tubular body including strands of thermoplastic bonding material and illustrating schematically displaced portions of the tubes resulting from forces exerted by a swollen active material.

A positive plate in this stage of assembly could be employed directly as a positive plate for a lead-acid battery, but there would be no enhanced resistance to expansion forces exerted by swelling of active material since reliance would be upon interference fits between insides of the tubes and insert parts of the upper and lower bonding elements. The effects of such swelling are illustrated diagrammatically in FIGS. 8 and 10.

Swelling of active material exerts forces in directions both axial and longitudinal to the central axis of the tube members. Longitudinal swelling forces will tend to displace the lower bonding element element, as shown in phantom as numeral 94 of FIG. 8; axial forces will tend to bulge the tube walls as indicated in phantom at numerals 96. This bulging may tend to foreshorten the tube member due to the nature of the braid. The resultant distortions and displacements tend to form gaps as 98 through which active material may be lost. This distortion as shown from a different viewpoint in FIG. 10, where it may be seen that the wall 100 of a substantially rectangular tube (similar to 24, 26, etc. of FIG. 2) may be forced toward an oval or round configuration as is suggested at 102. It is, therefore, an essential part of the invention that the thermoplastic constituents as 64 of the tubes be fused to both the upper and the lower bonding element means.

It is intended that fusion may be carried out in various well-known ways, the only criteria being that the variables of heat, pressure and time be balanced with suitable value so that fusion of the thermoplastic tube constituents into the surfaces of the bonding elements takes place.

FIG. 5 illustrates one desirable form of apparatus particularly suited for plates having tubes of a substantially rectangular cross-section as shown in FIG. 2. A conveyor belt 104 on rolls as 106 is drawn by a motor 54 in the direction indicated by arrow 108. Positive plate 110 of the invention is placed on belt 104 against positioning stops as 112, 114 and 116. As the belt advances, heat is applied from heating devices as 118, 120, 122, 124 (which may be of various forms) to both upper and lower surfaces of plate 110 at both ends thereof. The heat thus applied will be in a range sufficient only to soften the thermoplastic constituents of the tubes and the upper and lower bonding elements.

As belt 104 advances farther, pressure wheels as 126, 128, 130, 132 on opposite sides of plate 110 at both ends thereof exert a pressure sufficient to cause fusion integration of the thermoplastic tube constituents with the upper and lower bonding element means. The resultant structure is illustrated in FIG. 9.

Figure 9:
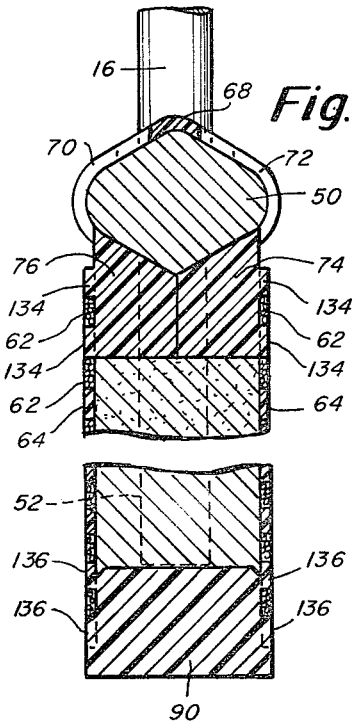
FIG. 9 is a view taken on the line 9—9 of FIG. 1 and illustrates diagramatically the strands of thermoplastic bonding material and portions of the upper and lower molded bonding elements after fusion, showing parts connected together.

Examination of FIG. 9 shows that certain of the thermoplastic constituents as 64 (reference FIG. 8) have been fusion integrated into insert portions as 74 and 76 of the upper bonding element means. Fusion integrated masses as 134 are thus created, and the tubes may be said to have been integrated with or made a part of the upper bonding element.

FIG. 9 also illustrates that a similar fusion integration has taken place with the lower bonding element means, with thermoplastic constituents as 64 being fusion integrated with insert portions as 90. Fusion integrated masses are thus created as shown by numerals as 136, and the tubes may be said to have been integrated with or made a part of the lower bonding element as well.

The resulting plate structure is characterized by having its grid structure and active material confined and contained in a fusion integrated unitary body comprising the tubes, the upper bonding element and the lower bonding element. Longitudinal swelling forces exerted by the active material cannot displace the lower bonding element since the said lower bonding element is tied to the top bar 50 of the grid structure, and the said longitudinal forces will be directed both upwardly and downwardly. The tube cannot elongate, since the axial swelling forces are attempting to cause a bulging of the tube. Similarly, the tube cannot bulge, since such bulging would cause a foreshortening of the tube.

It will be noted that spines as 52, 54, etc. are of such length that the lower ends thereof substantially abut insert portions as 90, 92, etc. of the lower bonding element, thus providing stiffeners against foreshortening. No gaps as 98 (FIG. 8) can occur, active material will not be lost, and active material will be confined on a homogeneous mass in contact with the spines as 52, 54, etc.

Figure 11:
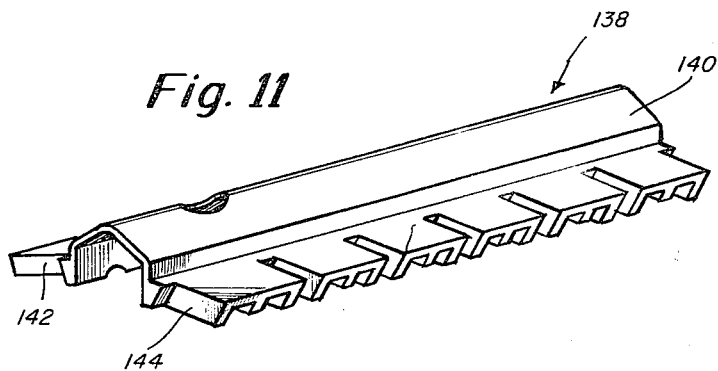
FIG. 11 is a perspective view illustrating a modified form of upper thermoplastic bonding element.

The upper bonding element means may be modified in various ways without departing from the scope of the claims. For example, FIG. 11 illustrates a modified form arrow 138 of upper bonding element means, in which the top part 68 and flexible sections as 70' and 72' of FIG. 3 are combined into a continuous mass 140. Insert portions as 142 and 144 are relieved to allow containment of additional active material.

It may be desired to employ tubes having a circular or otherwise curved cross-section. Such tubes may be braided from staple fibers and thermoplastic constituents as heretofore noted, and the upper bonding element means may have a configuration similar to arrow 146 of FIG. 4, in which insert parts as 148, 150 are shaped to conform to the tubes. Similarly, insert parts of a lower bonding element means may be formed having an arvuate or otherwise curved shape. However, in such cases, the apparatus of FIG. 5 may not provide pressure on portions of the tubes and bonding element means to produce fusion integration.

FIG. 6 illustrates apparatus more suitable for fusing positive plates of the invention wherein the tubes are of curved cross-section. In this Figure numeral 154 denotes a conveyor belt on rollers as 156, driven by a motor 158. Plate means 152 of the invention are placed on the conveyor 154 against stops as 160, 162, 164. Heat may be applied separately, as in FIG. 5, or heat and pressure may be applied simultaneously. Pressure is applied by jaws 166, 168, 170, 172, which are compressed by solenoids as 174, 176, 178, 180. Jaws 166, 168, etc. are formed with surfaces as 166a, 168a, etc. shaped so as to conform to the desired shape of tubes and bonding element insert parts. If it is desired to apply heat simultaneously with pressure, jaws at 166, 168, etc. may have included therein electrical heating means connected by wires as 182, 184. Operation of such apparatus will be in a stepped sequence as follows: the plate 152 is placed upon conveyor 154 against stops as 160, 162, 164; the plate is advanced by the conveyor in the direction of arrow numeral 186 until it is properly positioned between jaws as 166, 168, etc. at which time limit switch 188 is closed, stopping conveyor 154; heated jaws as 166, 168, etc. are closed and fusion integration is accomplished, jaws as 166, 168, etc. are retracted, conveyor 154 restarted, moving plate 152 away and a new plate into place.

Figure 7:
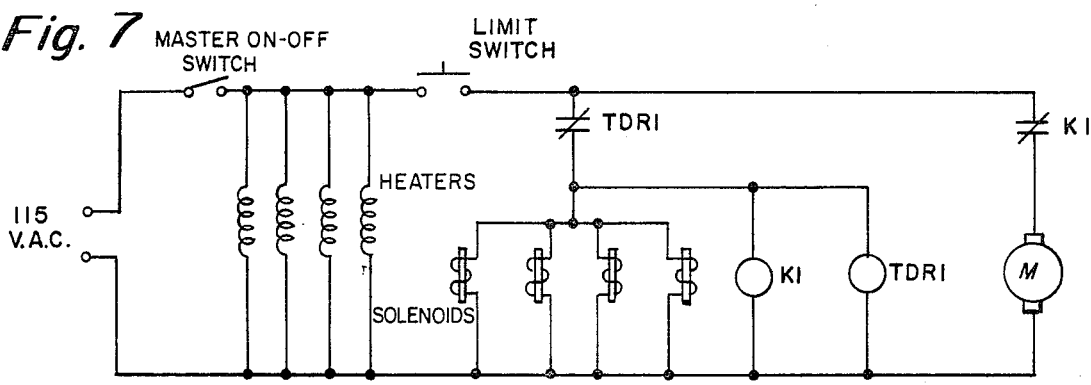
FIG. 7 is a wiring schematic for a control circuit for the apparatus shown in FIG. 6.

A simple control circuit for the a-paratus of FIG. 6 is shown in FIG. 7, wherein K1 designates a simple A-C powered relay having one set of normally-closed contacts and TDR1 designates a time-delay relay; also having a single set of normally-closed contacts and providing an "ON" delay. Circuit operation is as follows: closing of the limit switch applies current to the solenoids, thus closing the heated jaws, and also to the coils of relays R1 and TDR1; relay K1 stops the conveyor motor; after a preset time controlled by TDR1 the contacts of TDR1 open thus releasing the solenoids; and deactivating K1 and TDR1, the jaws are retracted and the motor restarted to begin the next cycle.

I claim:

1. A positive plate construction for use in a lead-acid type storage battery, said positive plate construction including a grid having a top bar, post, and spaced apart spines, active material and fabricated tubular bodies arranged to confine the active material around the spines and having constituent strands of a thermoplastic bonding material included therein, and thermoplastic upper and lower bonding element means occurring in fused relationship with respect to portions of said constituent strands of thermoplastic material at points inside the tubular bodies, said upper bonding element consisting of an elongated molded body formed with insert means, and said elongated body overlying the upper side of the top bar of the grid in fitted relationship therewith and said insert means being formed integrally with the elongated body and being arranged within upper ends of the tubular bodies to secure the upper ends of the tubular bodies in interlocked relationship with the grid.

2. The invention of claim 1 in which the fusion of the said thermoplastic strands with the upper molded bonding element occurs at separated points inside the upper ends of the tubular bodies.

* * * * *